Jan. 21, 1964 J. J. NYBERG 3,119,100

SUPERCONDUCTIVE SELECTION CIRCUITS

Filed Dec. 9, 1957

James J. Nyberg
INVENTOR.

BY Robert H. Fraser
ATTORNEY

United States Patent Office 3,119,100 Patented Jan. 21, 1964

3,119,100

SUPERCONDUCTIVE SELECTION CIRCUITS

James J. Nyberg, Torrance, Calif., assignor, by mesne assignments, to Thompson Ramo Wooldridge Inc., Cleveland, Ohio, a corporation of Ohio Filed Dec. 9, 1957, Ser. No. 701,668
18 Claims. (Cl. 340—173.1)

This invention relates to electrical circuits including superconductive circuit elements and more particularly to a new and improved electrical selection circuit including superconductive circuit elements for governing the path of an electrical current.

In digital computing and data processing equipment in which information is handled by means of electrical signals representing digital values, it is well known to employ circuits which control the path of an electrical current in accordance with the occurrence or concurrence of conditions established within the circuit. When the electrical current represents information, a combination of such circuits may be arranged to perform a computation or manipulation in accordance with a logical system. Accordingly, such circuits are sometimes known as "logical circuits."

In a co-pending United States patent application entitled "Superconductive Electrical Circuits," filed June 5, 1957, Serial No. 663,668, in the name of Eugene C. Crittenden, Jr., there is described an electrical circuit constructed of superconductive materials which is capable of sustaining a persistent circulating current flow around a loop indefinitely so long as the entire circuit remains superconducting. By virtue of the capacity of the circuit loop in sustaining a current, a device may be constructed for storing information as a function of the direction of persistent current flow, with the direction of current flow being ascertainable by applying a sensing pulse to the loop which renders a portion of the loop electrically resistive when the sensing pulse is additive with respect to the persistent current flow through that portion. Thus, to read the stored information, a sensing pulse may be applied to the loop and the appearance of a voltage across the electrically resistive portion indicates a persistent circulating current in one direction while the absence of a voltage pulse indicates that the direction of persistent current flow is in the opposite direction.

In another co-pending application entitled "Electrical Circuits" filed September 12, 1957, Serial Number 683,525, now issued U.S. Patent No. 3,060,323, in the name of James J. Nyberg, there is described an electrical circuit which includes at least two superconductive components through each of which condition representing current flows, having a value less than the critical current value of the component so long as the component remains superconducting, with the components being arranged so that the direction of condition representing current in one of the components is at all times opposite to the direction of condition representing current flow in at least one other of the components, whereby a signal current may be passed through the circuit via at least one of the superconductive components in a direction which is subtractive with respect to the direction of condition representing current flow therethrough. By means of the apparatus of the above described co-pending Nyberg application, a current may be passed to one or more of several output terminals in accordance with the direction of condition representing currents established within the circuit loops prior to the application of the signal or "read" current.

In the overall function of controlling the path of a signal current in accordance with conditions established within the circuit, the apparatus of the present invention is similar to the apparatus of the aforesaid co-pending Nyberg application. However, the present invention affords an improved control of a current and improved operation by combining the effects of a signal current and condition representing currents to govern the path of the signal current through the circuit.

Accordingly, one object of the present invention is to provide an improved electrical circuit for controlling the flow of an electrical current in accordance with the occurrence or concurrence of conditions established within the circuit.

Another object of the invention is to provide an improved logical circuit in which a signal current flowing through the circuit acts in conjunction with condition representing currents established within the circuit to cause the signal current to flow to a selected one or more of several output circuits.

Briefly, an electrical selection circuit in accordance with the invention includes a plurality of superconductive elements which are connected to a common input circuit, means for establishing condition representing currents within each of the superconductive elements, means coupling the input circuit to each of the superconductive elements for combining the effect of a current applied to the input circuit and the condition representing currents through the superconductive elements, and means applying an input current to the input circuit whereby the input current is passed by the superconductive elements in accordance with the combined effect of the input current and the condition representing currents.

In one particular embodiment, several circuit loops are connected in a branching circuit between a common input circuit and separate output circuits. Both the input circuit and setting coils are inductively coupled to the superconductive loops. Condition representing currents are established in the circuit loops by energizing the setting coils and an input current applied to the input circuit induces currents in the superconductive circuit loops by virtue of the inductive coupling. The input current is then passed to at least one selected output circuit via the superconductive circuit loops in accordance with voltages appearing in response to the combined effect of the currents induced in the superconductive circuit loops by the input current and the condition representing currents established by the setting coils.

A better understanding of the invention may be had from a reading of the following detailed description and an inspection of the drawings, in which.

At temperatures near absolute zero, some materials lose all resistance to the flow of electrical current and become perfect conductors. The phenomenon is called superconductivity and the temperature at which the change occurs from a normally resistive state to a superconductive state is called the transition temperature. It has been established that where a material is held at a temperature below its transition temperature the superconductive state may be extinguished by the application of an external magnetic field to the material or by current flow through the material in an amount in excess of a critical current value. A discussion of the phenomenon of superconductivity and many of the materials which are capable of becoming superconductive may be found in a book entitled "Superconductivity" by D. Schoenberg, Cambridge University Press, Cambridge, England, 1952, and in the aforesaid co-pending application of Eugene C. Crittenden, Jr.

Figure 1:
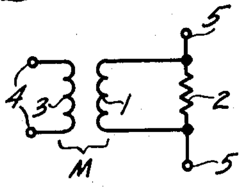
FIG. 1 is a schematic circuit diagram of a superconductive circuit loop which may be used in the electrical selection circuit of the invention.

FIG. 1 illustrates one type of electrical circuit loop described in the aforesaid co-pending application which is adapted to operate in accordance with the foregoing principles. The circuit of FIG. 1 includes a first conductor in the form of an inductance 1 and a second conductor in the form of a resistance element 2 connected to form a circuit loop. Both the inductance 1 and the resistance element 2 are constructed of materials which are superconductive at the operating temperature of the circuit. However, the resistance element 2 is constructed of a material having a critical current value at which the material switches from a superconductive state to a resistive state lower than the critical current value at which the inductance 1 switches from a superconductive state to a resistive state.

In operation, the electrical circuit of FIG. 1 is held at an operating temperature below the transition temperatures for both the resistance element 2 and the inductance 1. Since the material for the resistance element 2 is selected to have a critical current value lower than the critical current value of the material of the inductance 1, the entire circuit loop is superconductive for current flow less than the critical current value of the resistance element 2. Accordingly, no electrical resistance is presented to current flow less than the critical current value of the resistance element 2 and once such a current is established the current flows indefinitely. Thus, a persistent circulating current may be established in the circuit loop which will continue to flow so long as the inductance 1 and the resistance element 2 remain superconducting. However, since the resistance element 2 has a critical current value lower than that of the inductance 1, the resistance element 2 is subject to being made electrically resistive by a current flowing around the loop without affecting the superconductive state of the inductance 1 where the value of the current is in excess of the critical current value of the resistance element 2 and is lower than the critical current value of the inductance 1.

In the arrangement of FIG. 1, an electrical pulse for initiating a persistent circulating current may be applied to the circuit loop via an energizing coil 3. The bracket and the symbol "M" indicate that the inductance 1 and the coil 3 are mutually coupled so that a pulse applied to the terminals 4 is induced in the inductance 1. If the pulse appearing across the inductance 1 is sufficiently large to produce a current around the circuit loop in excess of the critical current value of the resistance element 2, the current within the circuit loop decays after the pulse disappears to a level approximately equal to or slightly less than the critical current value of the resistance element 2. At this point, the resistance element 2 switches from an electrically resistive state to a superconductive state and the current continues to flow around the circuit loop as a persistent circulating current so long as the resistance element 2 and the inductance 1 remain superconducting. Therefore, information may be stored in the circuit loop of FIG. 1 as a function of the direction of persistent circulating current flow by applying a pulse to the terminals 4 of a selected polarity.

In order to sense the direction of current flow within the circuit loop, a current pulse may be applied to a pair of terminals 5. Where the current pulse applied to the terminals 5 is additive with respect to a persistent circulating current flow through the resistance element 2, the total amount of current becomes sufficiently large to render the resistance element 2 electrically resistive so that a voltage appears at the terminals 5. As a result of the voltage across the resistance element 2, the direction of persistent circulating current flow within the circuit loop is reversed. Thus, after the voltage appears a persistent circulating current flows around the circuit loop in a direction opposite to the direction of persistent circulating current flow prior to the application of the pulse to the terminals 5. On the other hand, a pulse applied to the terminals 5 causing a current flow which is subtractive with respect to the persistent circulating current flowing through the resistance element 2 does not render the resistance element 2 electrically resistive so long as the net current flow does not exceed the critical current value of the resistance element 2. Accordingly, no voltage appears across the resistance element 2 in the latter case and the persistent circulating current in the circuit loop continues to flow in the same direction as before. Thus, by applying a pulse to the terminals 5, the direction of persistent circulating current flow may be ascertained by the presence or absence of a voltage across the resistance element 2.

Figures 2, 3:
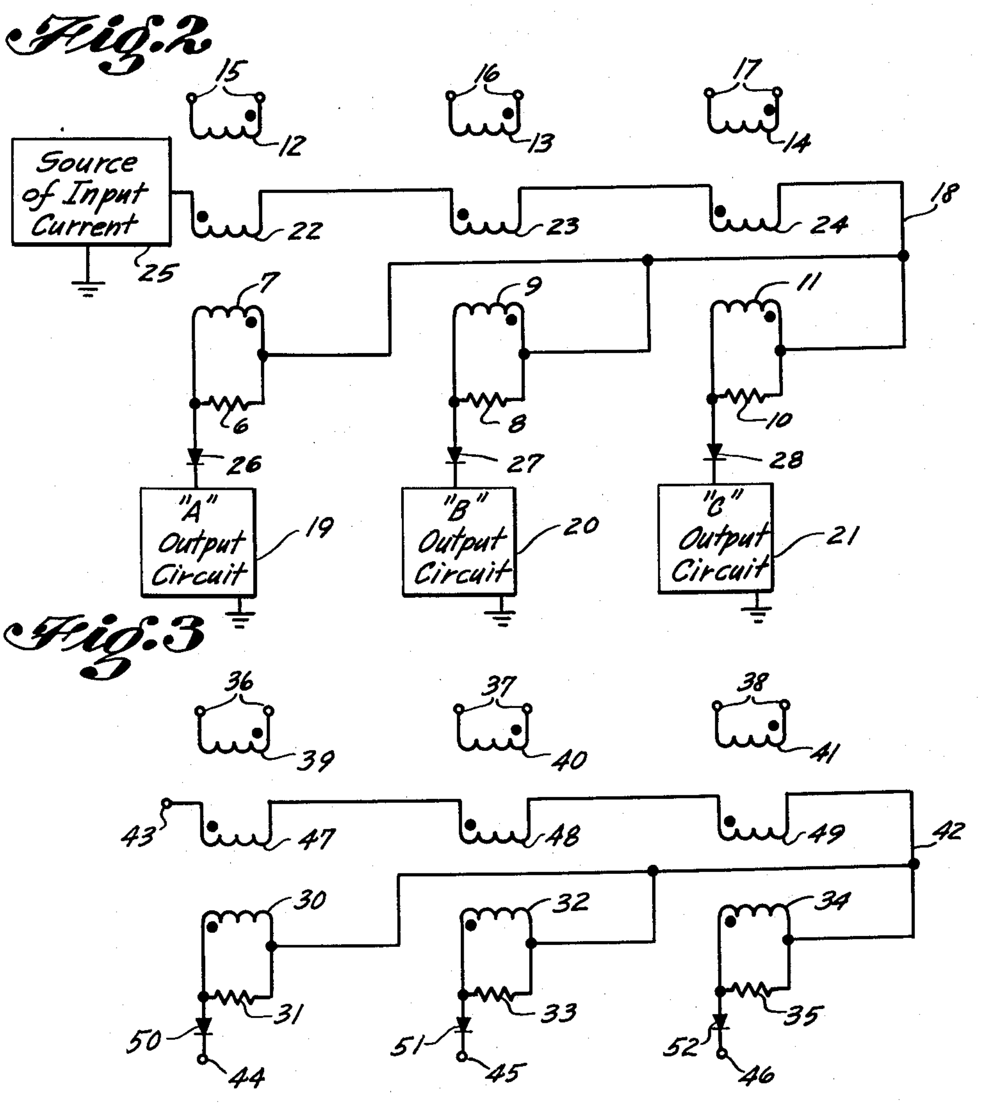
FIG. 2 is a combined block and schematic circuit diagram of an electrical selection circuit in accordance with the invention.
FIG. 3 is a schematic circuit diagram of another electrical selection circuit in accordance with the invention.

In FIG. 2 there is shown an electrical selection circuit in accordance with the invention which includes three superconductive circuit loops similar to the one shown in FIG. 1. One of the superconductive loops includes a resistance element 6 and an inductance 7, a second of the circuit loops includes a resistance element 8 and an inductance 9, and a third of the circuit loops includes a resistance element 10 and an inductance 11. Associated with and coupled to each of the circuit loops is a setting coil 12, 13, 14. By means of the pairs of terminals 15, 16 and 17 connected to the setting coils 12, 13 and 14, persistent circulating currents may be established in the circuit loops as described above in connection with FIG. 1.

The superconductive loops including the resistance elements 6, 8 and 10 and inductances 7, 9 and 11 of FIG. 2 are connected in a branching circuit having a common input circuit 18 and separate output circuits 19, 20 and 21 corresponding to each of the superconductive circuit loops. Thus, the superconductive loop of the resistance element 6 and inductance 7 is connected between the common input circuit 18 and an "A" output circuit 19, the superconductive circuit loop of the resistance element 8 and inductance 9 is connected between the common input circuit 18 and a "B" output circuit 20, and the superconductive circuit loop of the resistance element 10 and inductance 11 is connected between the common input circuit 18 and the "C" output circuit 21. The input circuit 18 includes three coils 22, 23 and 24 which are connected serially between a source of input current 25 and the superconductive circuit loops. Each of the coils 22, 23 and 24 is inductively coupled to one of the inductances 7, 9 and 11 of the superconductive circuit loops.

In operation, set current pulses may be applied to the setting coil terminals 15, 16 and 17 to establish persistent circulating currents in the superconductive circuit loops having a direction corresponding to the polarity of the set pulses. Since the polarity of the set pulses and the direction of persistent circulating current flow may represent an external condition, the persistent circulating currents in FIG. 2 may be termed condition representing currents. The black dots adjacent the ends of each of the coils 12—14, 22—24 and 7, 9 and 11 indicate the relative polarity of the coupling in conventional fashion.

When an input current pulse is provided by the source of input current 25, its effect is to induce current flow in a clockwise direction within the superconductive circuit loops by virtue of the mutual coupling between the coils 22, 23 and 24 and the inductances 7, 9 and 11, which may be either additive or subtractive with respect to persistent circulating currents established within the circuit loop. For example, assuming that appropriate set pulses have been applied to the setting coil terminals 15, 16 and 17 to establish clockwise circulating currents in the superconductive loops illustrated in the center and to the right of FIG. 2, and counterclockwise current in the superconductive loop illustrated to the left of FIG. 2, the clockwise induced currents produced in the circuit loops in response to a positive input current pulse from the input current source 25 are additive with respect to the circulating currents in the center and right hand circuit loops and subtractive with respect to the circulating current in the left hand circuit loop.

Where the set pulses and input circuit pulse are of the proper amplitude, the sum of the currents flowing around the center and right hand superconductive circuit loop exceeds the critical current values of the resistance elements 8 and 10. Thus, the resistance elements 8 and 10 are rendered electrically resistive and voltages appear across the resistance elements 8 and 10.

In the circuit of FIG. 2, both the polarity of the voltages and the resistive condition of the resistance elements opposes the flow of input current from the source of input current 25 through the superconductive loops in which the voltage appears.

In the left hand superconductive loop in which the clockwise current induced by the input pulse is subtractive with respect to the established counterclockwise persistent circulating current, the sum of the currents does not exceed the critical current value of any part of the loop so that no part of the circuit loop becomes electrically resistive and no voltage appears. Therefore, the left hand superconductive loop favors the conduction of the input current from the input circuit 18 to the "A" output circuit 19, while the center and right hand superconductive circuit loops oppose the flow of input current with the result that substantially all of the input current is passed to the "A" output circuit 19. By applying suitable set pulses to the setting coil terminals 15, 16 and 17 the input current may be passed to any selected one of the output circuits 19, 20 and 21.

In order to enhance the operation of the circuit of FIG. 2 in directing the input current to a selected output circuit, unilateral conduction devices, such as the diodes 26, 27 and 28, may be connected between the superconductive circuit loops and the output circuits 19—21. The voltages generated within the superconductive loops are of the proper polarity to render the diodes adjacent the loops in which the voltages appear substantially non-conducting so that no current can flow to an output circuit associated with a superconductive loop in which a voltage appears. In addition, the voltages are applied via the common connection of the input circuit 18 to the diode connected serially with the superconductive loop in which no voltage appears in a direction which tends to favor conduction. Thus, the generated voltages function in conjunction with the diodes 26, 27 and 28 to isolate the output circuits which have not been selected to receive the input current, while at the same time tending to cause current to flow to the selected output circuit. Accordingly, the effectiveness of the circuit may be increased substantially by including the diodes 26, 27 and 28. Of course, where the entire circuit of FIG. 2 is held at the same temperature, the diodes 26, 27 and 28 must be adapted to operate as unilateral conduction devices at the relatively low temperature of the superconductive loops.

In the circuit shown in FIG. 2 and described above, the appearance of voltages within the circuit tends to oppose the flow of the input current so as to cause the input current to flow through a path in which no voltage appears. In contrast, the selection circuit illustrated in FIG. 3 is arranged so that the appearance of a voltage favors conduction of the input current to a selected output.

With the exception of the polarity of the mutual coupling between the coils and inductances, the circuit of FIG. 3 is a similar in construction to the circuit of FIG. 2. Accordingly, the circuit of FIG. 3 includes a first superconductive loop having an inductance 30 and a resistance element 31, a second superconductive loop including an inductance 32 and a resistance element 33, and a third superconductive loop having an inductance 34 and a resistance element 35. Persistent circulating currents may be established within the superconductive loops of FIG. 3 by applying set pulses to the terminals 36, 37 and 38 connected to the setting coils 39, 40 and 41, one of which is coupled to each of the circuit loops. By reversing the direction of set pulse current flow through the setting coils 39, 40 and 41, the persistent circulating currents established within the superconductive loops may each be either clockwise or counterclockwise as desired.

As in FIG. 2, the circuit of FIG. 3 includes a common input circuit 42 which may be connected to an input current source via an input current terminal 43. The superconductive circuit loops of the inductances 30, 32 and 34 and the resistance elements 31, 33 and 35 are connected between the input circuit 42 and the output terminals 44, 45 and 46 to which may be connected separate output circuits. Connected serially in the input circuit 42 are three coils 47, 48 and 49. In contrast to FIG. 2, the coils 47, 48 and 49 of FIG. 3 are coupled to the inductances 30, 32 and 34 of the superconductive loop with a polarity which induces currents within the superconductive loops in a counterclockwise direction in response to a positive going input current pulse. The polarity of the coupling is indicated in conventional fashion by means of the black dots adjacent the ends of the coils. A diode 50 is connected between the left hand superconductive circuit loop of FIG. 3 and the output terminal 44. In like fashion, a diode 51 is connected between the center superconductive loop and the output terminal 45 and a diode 52 is connected between the right hand superconductive loop and the output terminal 46.

In operation, the circuit of FIG. 3 differs from that of FIG. 2 in the appearance of a voltage within one of the circuit loops which tends to cause the input current to flow through that circuit loop while at the same time tending to reduce the flow of input current through the other circuit loops. For example, if we assume that suitable set pulses have been applied to the setting coil terminals 36, 37 and 38 to establish persistent circulating currents which are clockwise in the center and right hand superconductive loops and counterclockwise in the left hand superconductive circuit loop, an input current applied to the input current terminal 43 of positive polarity induces currents through the inductances 30, 32 and 34 which are subtractive with respect to the clockwise current in the center and right hand superconductive loops and additive with respect to the counterclockwise current in the left hand superconductvie loop. Accordingly, the resistance element 31 of the left hand superconductive loop is rendered resistive since the sum of the induced and persistent current flow exceeds the critical current value. Thus, a voltage appears across the resistance element 31 of the left hand superconductive loop while no voltage appears in the other superconductive circuit loops in which the induced current is subtractive with respect to the clockwise persistent circulating currents.

Due to the polarity of the coupling between the coils 47, 48 and 49 and the inductances 30, 32 and 34, the polarity of the generated voltage tends to cause the input current to flow through the resistance element across which the voltage appears. Accordingly, the current flows to an output circuit which has been selected in accordance with the signals applied to the setting windings 39, 40 and 41. In addition, the voltage generated within the selected one of the superconductive circuit loops affects the state of conduction of the diodes 50, 51 and 52 so as to enhance the current flow to a selected output circuit. That is, the polarity of a voltage appearing across one of the resistance elements 31, 33 and 35 tends to lower the potential of the common connection of the input circuit 42 and to bias the immediately adjacent diode in a forward direction. In addition, the voltage appearing on the common connection is applied to the other two of the diodes in a direction which renders the diodes associated with the non-selected output circuits substantially non-conducting. Therefore, the input current from the input current terminal 43 flows to a selected output terminal and substantially no input current flows to the non-selected output terminals.

Although it is preferable to include the diodes 50, 51 and 52 to isolate the non-selected output terminals, the input current may be substantially directed to a selected output terminal due to the presence of a voltage in a superconductive loop which favors conduction between the common input circuit 42 and the selected one of the output terminals 44—46. However, since the superconductive loops associated with the non-selected output terminals in the arrangement of FIG. 3 remain superconducting, it will be desirable for most purposes to include the diodes 50—52 in order to enhance the operation of the circuit by reducing the current flow to the non-selected output terminals.

The physical construction of superconductive loops for use in the circuits of FIGS. 1–3 is described in detail in the aforementioned co-pending application of Eugene C. Crittenden, Jr. One such arrangement includes an insulated carrier on one side of which is supported a strip of a suitable material forming a resistance element, as for example, a strip comprising an evaporated metal film. For convenience, the material of the resistance element may be extended to form terminal portions which electrically connect with an inductance element comprising several turns of wire. Although any materials having the capacity of being rendered superconducting and having the correct relationship of critical current values may be used for the resistance element and the inductance, one suitable material for the inductance wire is lead. Where lead is selected for the inductance wire, examples of suitable materials for the resistance element are tantalum, tin, or alloys thereof.

An alternative arrangement of a circuit loop may be constructed by printed circuit techniques in which suitable materials are supported by an insulating carrier in a spiral conductor to form an inductance and a strip to form a resistance element. The spiral conductor may be connected across the resistance element to form a circuit loop.

In practice, it has been found that the presence of a certain amount of inductance in the resistance element does not adversely affect the operation of the circuit, and the value of the inductance does not have to be large. Therefore, the inductance may be provided by distributed inductance in any part of the circuit loop. For example, a circuit loop may be constructed including a first conductor of a superconductive material having a given critical current value and a second conductor having a given critical current value differing from the given critical value of the first conductor. Thus, one of the conductors may be rendered electrically resistive in response to current flow in excess of its critical current value without affecting the superconductive condition of the other conductor. Accordingly, conventional schematic circuit diagram symbols for the inductances and resistance elements in the schematic circuit diagrams of FIGS. 1–3 have been used for convenience and for purposes of explanation and do not necessarily indicate the presence of conventional components.

One suitable arrangement for maintaining the circuits of the invention at a proper operating temperature below the transition temperatures of the superconductive materials employed includes an exterior insulated container which is adapted to hold a coolant such as liquid hydrogen. Within the container an inner insulated container is suspended for holding a coolant, such as liquid helium in which the circuits are immersed. Where the inductance is constructed of lead and the resistance element is constructed of tantalum, a suitable operating temperature is 4.2° Kelvin which is the boiling point of helium. Other suitable operating temperatures may be obtained by regulating the vapor pressure within the helium container.

In order to enhance the magnetic field generated by currents flowing within the circuit, and hence reduce the switching time required to establish a persistent current in a given direction or to reverse the direction of persistent current flow, the conductors may be made in other than a cylindrical cross section. For example, where an evaporated layer is used for the resistance element, the element may comprise a relatively thin strip which leads to an increased strength of internal magnetic field produced by a given current which in turn lowers the critical current value and decreases the switching time. In addition, the switching time can be decreased by alloying the material with small concentrations of other chemical elements. Suitable alloying elements, for example, in the case of tin are antimony and indium. Both of these elements form solid solutions with tin so that the antimony or indium atoms are randomly scattered through the tin crystals, with the antimony or indium atoms substituting for tin atoms in the crystal lattice. Both antimony and indium differ by unity in valence from tin so that they scatter the electron waves in the tin by coulomb scattering. Hence, they contribute a large electrical resistivity per atom percent addition.

Although the following values are given by way of example only, it has been found that the value of the inductance may be of the order of 1 microhenry and the value of the resistance element in a resistive condition may be of the order of .5 ohms. Workable circuit loops for sustaining persistent current and for rapid switching have been constructed in which the physical dimensions of a strip of tin for the resistance element were as follows:

| | Centimeters |
|---|---|
| Thickness | $3.4\times10^{-5}$ – $10.2\times10^{-5}$ |
| Width | 0.27 to 0.18 |
| Length | .635 |

The value of the inductance should be large enough so that the time constant for decay of circulating current, $$\frac{L}{R}$$

when the resistance element is not superconducting is about as large as or larger than the delay times required for the resistance element to change from resistive to superconducting and vice versa. For a given delay time, the value of the inductance then depends upon the value of the resistance element and thus a smaller resistance will permit a smaller inductance and a consequent smaller space required for the inductance. The value of the resistance element should be large enough to generate a suitable voltage pulse but should not be so large as to generate substantial amounts of heat or require substantial amounts of power to switch the device from one mode of operation to the other.

Although the condition of a material while superconducting is generally described as being a condition of zero resistance, it will be appreciated that a small amount of resistance may be present in the superconductive condition of a material which does not necessarily affect the operation of the circuit. Accordingly, the invention should not be limited by any particular words which have been used to explain the theory of operation.

Although each of the exemplary circuits of FIGS. 2 and 3 is arranged to pass an input current to a selected one of three separate output circuits, it will be appreciated that any number of superconductive circuit loops may be used to pass the input signal to any selected one of a number of output circuits. In addition, the input current may be passed to more than one selected output circuit by suitably energizing the set coils to establish persistent circulating currents in appropriate directions in the superconductive loops. The circuits of FIGS. 2 and 3 are intended to be by way of example only, to illustrate the general manner in which the invention may be used in electrical selection circuits.

More complex logical functions may be readily performed through a suitable combination or modification of the exemplary circuits without departing from the invention. Accordingly, the invention should be accorded the full scope of the annexed claims and should not be limited to the particular embodiments illustrated in the drawing and described herein.

I claim:

1. An electrical circuit including the combination of a plurality of superconductive components, means connecting certain ones of said superconductive components in respective persistent circulating current loops, a common input circuit electrically connected to one of the plurality of superconductive components, said common input circuit also being inductively coupled to all of the plurality of superconductive components, means establishing currents through the respective persistent circulating current loops in accordance with external conditions, means applying an input current to the common input circuit, and means for controlling the passage of input current by at least one of the superconductive components in accordance with the currents flowing therethrough.

2. An electrical circuit including the combination of a plurality of superconductive components, a common input circuit inductively coupled to one of the plurality of superconductive components, said common input circuit also being electrically connected to all of the plurality of superconductive components, means applying an input current to the common input circuit, means for inducing condition representing currents in the superconductive components, means for controlling the superconducting condition of said superconductive components in accordance wtih the combination of said condition representing currents with currents induced in the superconductive components by said common input circuit, and means for controlling the passage of input current by at least one of the components in accordance with the concurrence of an input current and said condition representing currents.

3. An electrical circuit in accordance with claim 2 wherein said last mentioned means comprises a plurality of unilateral conduction devices respectively connected serially with each of the superconductive components.

4. An electrical circuit including the combination of an input terminal, a plurality of output terminals, a plurality of superconductive circuit loops respectively connected between each of the plurality of output terminals and the input terminal, means establishing persistent circulating currents within each of the superconductive circuit loops in accordance with external conditions, means applying an input current to the input terminal, and means inductively coupling the input terminal to all of the superconductive circuit loops, whereby a current is induced in each of the superconductive circuit loops in response to the input current and the input current is passed to selected ones of the output terminals in accordance with the combined effect of the persistent circulating currents and induced currents in the superconductive circuit loops.

5. An electrical circuit including the combination of an input terminal, a plurality of output terminals, a plurality of superconductive loops respectively connected serially between each of the plurality of output terminals and the input terminal, means applying an input current to the input terminal, and means establishing voltages within selected ones of the superconductive loops whereby the input current is passed to selected ones of the output terminals in accordance with the concurrence of an input current and the voltages established in the superconductive loops.

6. An electrical circuit in accordance with claim 5 including a plurality of unilateral conduction devices respectively connected serially between each of the superconductive loops and an output terminal.

7. An electrical circuit including the combination of an input terminal, a plurality of output terminals, a plurality of superconductive loops respectively connected serially between each of the plurality of output terminals and the input terminal, each of said superconductive loops including an inductance and a resistance element which is capable of being rendered electrically resistive in response to current flow in excess of a predetermined critical current value, a plurality of setting coils inductively coupled to the superconductive loops for establishing persistent circulating currents therein having a value less than said predetermined critical current value, means inductively coupling the input terminal to each of the superconductive loops for inducing currents therein in accordance with the passage of input current, and means applying an input current to the input terminal whereby the input current is passed to predetermined ones of the output terminals in accordance with the combined effect of the persistent circulating currents and induced currents in the superconductive loops.

8. An electrical circuit including the combination of an input terminal, a plurality of output terminals, a plurality of superconductive loops respectively connected serially between each of the plurality of output terminals and the input terminal, each of said circuit loops including an inductance and a resistance element which is capable of being rendered electrically resistive in response to current flow in excess of a predetermined critical value, means applying an input current to the input terminal, and means selectively establishing currents in said superconductive loops having a value greater than said predetermined critical current value, whereby the input current is passed to predetermined ones of the output terminals in accordance with the currents established in the superconductive circuit loops.

9. An electrical circuit including the combination of an input terminal, a plurality of output terminals, a plurality of superconductive loops respectively connected serially between each of the plurality of output terminals and the input terminal, each of said loops including an inductance and a resistance element which is capable of being rendered electrically resistive in response to current flow in excess of a predetermined critical current value, means for establishing persistent circulating currents in the loops in selected directions having a value less than said predetermined critical current value, means applying an input current to the input terminal, and means coupling the input terminal to each of the superconductive loops for inducing currents which are additive with respect to the persistent circulating current in at least one of the loops to render at least one of the resistance elements electrically resistive to generate a voltage, whereby a current is passed to a predetermined one of the output terminals in accordance with the generation of a voltage by said electrically resistive elements.

10. An electrical circuit in accordance with claim 9 including a plurality of unilateral conduction devices respectively connected serially between each of the superconductive loops and an output terminal.

11. An electrical circuit for passing an input current to a selected output including the combination of a plurality of superconductive loops, each of said loops including an inductance and a resistance element which is capable of being switched from a superconductive state to a resistive state in response to current flow in excess of a predetermined critical current value, a common connection to all of the superconductive loops, means applying an input current to the common connection, a first plurality of coils inductively coupled to the superconductive loops and electrically connected serially to the common connection for inducing currents in the superconductive loops in response to an input current, and a second plurality of coils adapted to establish persistent circulating currents in each of the superconductive loops in directions corresponding to external conditions, whereby the input current is passed by selected ones of the superconductive loops in accordance with the combined effect of the persistent circulating currents and induced currents within the superconductive circuit loops.

12. An electrical circuit for controlling the path of an electrical current including the combination of an input circuit path for receiving input currents, a plurality of output circuit paths connected to the input circuit path, each of said output circuit paths including a superconductive loop having an inductance and a resistance element which is capable of being switched from a superconductive state to a resistive state in response to current flow therethrough in excess of a predetermined critical current value, means inducing currents in the superconductive loops in accordance with the passage of current through the input circuit path, and means establishing persistent circulating currents in each of the superconductive loops in accordance with external conditions, whereby an input current is passed by selected ones of the output circuit paths in accordance with the combined effect of the persistent circulating currents and induced currents in the superconductive loops.

13. An electrical circuit for controlling the path of an electrical current including the combination of an input circuit path for receiving input current, a plurality of output circuit paths connected to the input circuit path, each of said output circuit paths including a superconductive circuit loop having an inductance and a resistance element which is capable of being switched from a superconductive state to a resistive state in response to current flow therethrough in excess of a predetermined critical current value, means establishing persistent circulating currents in each of the circuit loops having a value less than said critical current value, and means inducing a current in each of the circuit loops in response to the passage of current through the input circuit path which is additive with respect to the persistent circulating current in at least one circuit loop to render at least one resistance element electrically resistive to generate a voltage whereby the input current is passed by a selected one of the output circuit paths in accordance with voltages established across the resistance elements.

14. An electrical circuit in accordance with claim 13 including a plurality of unilateral conduction devices one of which is connected serially with a superconductive circuit loop in each of the output circuit paths.

15. An electrical circuit for passing an input current to a selected one of a plurality of output circuits including the combination of an input terminal which is adapted to receive an input current, a plurality of output circuits, a plurality of superconductive loops respectively connected serially between each of the plurality of output circuits and the input terminal, each of said loops including an inductance and a resistance element which is capable of being switched from a superconductive state to an electrically resistive state in response to current flow in excess of a predetermined current value, means for establishing persistent circulating currents in the loops in selected directions having a value less than said predetermined critical current value, and means coupling the input terminal to each of the superconductive circuit loops with a polarity which induces a current in one of the circuit loops which is additive with respect to the persistent circulating current flowing therein to induce a voltage which favors the passage of the input current to the output terminal connected to the loop in which the voltage appears.

16. An electrical circuit in accordance with claim 15 including a plurality of diodes respectively connected serially between each of the superconductive loops and an output terminal whereby the diode adjacent the selected output terminal is rendered conducting by the voltage generated within the loop and the other diodes are rendered substantially non-conducting.

17. An electrical circuit for passing an input current to a selected one of a plurality of output circuits including the combination of an input terminal which is adapted to receive an input current, a plurality of output circuits, a plurality of superconductive loops respectively connected serially between each of the plurality of output circuits and the input terminal, each of said loops including an inductance and a resistance element which is capable of being switched from a superconductive state to an electrically resistive state in response to current flow in excess of a predetermined critical current value, means for establishing persistent circulating currents in the loops in selected directions having a value less than said predetermined critical current value, and means coupling the input terminal to each of the superconductive circuit loops with a polarity which induces currents in one less than all of the circuit loops which is additive with respect to the persistent circulating current flowing therein to induce voltages which oppose the passage of the input current whereby the input current is directed to an output terminal via a superconductive circuit loop in which the induced current is subtractive with respect to the persistent circulating current.

18. An electrical circuit in accordance with claim 17 including a plurality of diodes respectively connected serially between each of the superconductive loops and an output terminal whereby the diode adjacent the selected output terminal is rendered conducting by the voltages generated within the loops and the other diodes are rendered substantially non-conducting.

References Cited in the file of this patent

UNITED STATES PATENTS

| | | |
|---|---|---|
| 2,719,773 | Karnaugh | Oct. 4, 1955 |
| 2,832,897 | Buck | Apr. 29, 1958 |
| 2,877,448 | Nyberg | Mar. 10, 1959 |
| 2,888,201 | Housman | May 26, 1959 |
| 2,930,908 | McKeon | Mar. 29, 1960 |
| 2,969,469 | Richards | Jan. 24, 1961 |

OTHER REFERENCES

"A Cryotron Catalog Memory System" (Slade et al.), Proceedings of the Eastern Joint Computer Conference, December 10–12, 1956, pp. 115–119.